(12) United States Patent  
Yamamoto et al.

(10) Patent No.: US 6,992,966 B2  
(45) Date of Patent: Jan. 31, 2006

(54) OPTICAL PICKUP DEVICE

(75) Inventors: Kenji Yamamoto, Kanagawa (JP); Kiyoshi Osato, Chiba (JP); Yoshiaki Kato, Tokyo (JP)

(73) Assignee: Sony Corporation (JP)

( * ) Notice: Subject to any disclaimer, the term of this patent is extended or adjusted under 35 U.S.C. 154(b) by 485 days.

(21) Appl. No.: 10/166,601

(22) Filed: Jun. 12, 2002

(65) Prior Publication Data

US 2003/0002425 A1 Jan. 2, 2003

(30) Foreign Application Priority Data

Jun. 13, 2001 (JP) .................................... P2001-179245  
Sep. 7, 2001 (JP) .................................... P2001-272388

(51) Int. Cl.  
*G11B 7/00* (2006.01)

(52) U.S. Cl. ................................ 369/112.02; 369/44.23; 369/44.32

(58) Field of Classification Search ............ 369/112.02, 369/53.19, 44.32, 44.23, 94  
See application file for complete search history.

(56) References Cited

U.S. PATENT DOCUMENTS 5,416,757 A * 5/1995 Luecke et al. ......... 369/112.02

* cited by examiner

*Primary Examiner*—Thang V. Tran  
(74) *Attorney, Agent, or Firm*—Rader, Fishman & Grauer PLLC; Ronald P. Kanane (57) ABSTRACT

An optical pickup device including a light source, an objective lens for converging a light beam emitted from the light source at a signal recording surface of an optical recording medium and irradiating the signal recording surface of the optical recording medium with the light beam, and a liquid crystal device, disposed in a light path between the light source and the objective lens, for giving a predetermined phase distribution to transmission light that passes through the liquid crystal device, with both front and back surfaces of the liquid crystal device being flat surfaces. In the optical pickup device, the liquid crystal device is constructed by sandwiching a liquid crystal molecule layer by a pair of transparent substrate. In addition, a liquid-crystal-molecule-layer-sandwiching-side surface of each transparent substrate has a shape that is formed when a thickness distribution of the liquid crystal molecule layer is similar to a phase distribution that is produced when a predetermined aberration occurs.

10 Claims, 9 Drawing Sheets

REFRACTIVE INDEX: n1

FIG. 6

REFRACTIVE INDEX: n3

FIG. 7

REFRACTIVE INDEX: n3 + Δn

FIG. 8

SPHERICAL ABERRATION

FIG. 9

COMA

OPTICAL PICKUP DEVICE

BACKGROUND OF THE INVENTION

1. Field of the Invention

The present invention relates to an optical pickup device forming an optical recording/reading apparatus, such as, what is called an optical disk system, a magneto-optical disk system, an optical card system.

2. Description of the Related Art

Hitherto, optical disks, such as CDs (compact disks) (trademark) and DVDs (digital versatile disks) (trademark), have been proposed as optical recording media. In addition, optical pickup devices for writing information signals to and reading out information signals from such optical disks have been proposed.

In recent years, in order to increase the recording capacity of such optical disks, in optical pickup devices, the wavelengths of light beams emitted from a light source are made shorter, and the NA (numerical aperture) of an objective lens for converging the light beams on a signal recording surface of such optical disks is made high.

For example, the wavelength of light emitted from a semiconductor laser (LD) serving as a light source in an optical pickup device is 780 nm in an optical pickup device for a CD and is 650 nm in an optical pickup device for a DVD having a larger recording capacity. The numerical aperture (NA) of an objective lens in an optical pickup device is 0.45 in an optical pickup device for a CD and is 0.60 in an optical pickup device for a DVD.

A semiconductor laser having a light-emitting wavelength of 405 nm (blue violet) and an objective lens having a numerical aperture (NA) of 0.85 have been proposed. By using such a semiconductor laser and an objective lens in the optical pickup device, the recording capacity of an optical disk is further increased.

However, when, as mentioned above, the light-emitting wavelength of a semiconductor laser (light source) is made shorter, and the numerical aperture of an objective lens is made high, wave aberrations are considerably increased in an optical system due to various production errors. More specifically, in the case where production errors are about the same, the shorter the light-emitting wavelength of a semiconductor laser is made, or the higher the numerical ratio of an objective lens is made, the larger the wave aberrations become. When wave aberrations in an optical system increase, optical performance is reduced, so that proper writing and reading out of information signals cannot be carried out.

Accordingly, there has been proposed, for example, a related optical pickup device for a DVD including a mechanism for changing relative tiltings between the optical pickup device and an optical disk, so that when skewing of the optical disk occurs, the optical axis is always made perpendicular to a read-out surface of the optical disk.

However, it is not possible to properly correct various wave aberrations that occur due to the occurrence of various production errors in an optical device by only adjusting the tilting of the entire optical pickup device with respect to the optical disk in this way. In particular, it is not possible to correct wave aberrations caused by thickness and tilting errors of the optical recording medium.

Various other structures for correcting wave aberrations in an optical pickup device have hitherto been proposed. One example is a structure using a liquid crystal device. In this structure, the liquid crystal device is inserted at a light path between a light source and an objective lens and, by the liquid crystal device, a desired phase distribution is given to the transmission light. In other words, in this structure, a phase that is opposite to that produced by any wave aberrations that occur is previously given to incident light using the liquid crystal device, so that there are no aberrations at an image-forming surface.

In the liquid crystal device, substrates which sandwich liquid crystal molecules are ordinarily planar glass substrates. Electrodes for applying an electrical voltage to the liquid crystals are formed on the substrates. The liquid crystal molecules are lined up along alignment films formed on the glass substrates and are moved by the application of an electrical voltage using the electrodes formed on the substrates. Such movements of the liquid crystal molecules change the refractive index of the entire liquid crystal device, so that the phase of the transmission light that passes through the liquid crystal device can be changed. In order to give a phase distribution to the transmission light, an electrical voltage distribution is created in the electrical voltage applied using the electrodes. An example of a simple structure for achieving this is formed by dividing the electrodes into at least two portions. By separately applying voltages corresponding to desired phase distributions to the divided electrode portions, voltage distributions which match the number of electrodes and the applied voltages are formed, so that nearly desired phase distributions are provided in the transmission light. Obviously, when the number of divisions of the electrodes is larger, so that the divided electrode portions are smaller, it is possible to produce an ideal phase distribution.

However, in such a liquid crystal device, the larger the number of divisions of the electrodes, the larger the area of electrodeless portions formed between the electrode portions becomes. Since the refractive indices of the liquid crystals at the electrodeless portions differ from the refractive indices of the liquid crystals at the electrode portions, not only is image formation adversely affected, but also diffraction of light and other phenomena occur at the boundary between the liquid crystals at the electrode portions, thereby resulting in a loss in the quantity of light. If a semiconductor laser serving as a light source has enough power, such a loss in the quantity of light caused by the diffraction of light is not a problem, but in order to increase the life of the semiconductor laser, it is desirable that the loss in the quantity of light in the liquid crystal device be small.

SUMMARY OF THE INVENTION

Accordingly, the present invention has been proposed in view of the above-described circumstances, and it has as its object the provision of an optical pickup device which can, while keeping the loss of light emitted from a light source as low as possible, properly correct wave aberrations that occur due to various production errors in an optical device, particularly, aberrations resulting from errors in thickness and tilting of an optical recording medium.

To this end, according to a first aspect of the present invention, there is provided an optical pickup device comprising a light source, an objective lens for converging a light beam emitted from the light source at a signal recording surface of an optical recording medium and irradiating the signal recording surface of the optical recording medium with the light beam, and a liquid crystal device, disposed in a light path between the light source and the objective lens, for giving a predetermined phase distribution to transmission light that passes through the liquid crystal device, with both front and back surfaces of the liquid crystal device being flat surfaces. In the optical pickup device, the liquid crystal device includes a pair of transparent substrates and a liquid crystal molecule layer that is formed so as to be sandwiched between the pair of transparent substrates. In addition, a liquid-crystal-molecule-layer-sandwiching-side surface of at least one of the pair of transparent substrates has a shape that is formed such that a thickness distribution of the liquid crystal molecule layer is similar to a phase distribution that is produced when spherical aberration occurs due to an error in a thickness of a transparent layer that covers the signal recording surface of the optical recording medium.

Although not exclusive, a liquid-crystal-molecule-layer-sandwiching-side surface of the other of the pair of transparent substrates may be a flat surface.

According to a second aspect of the present invention, there is provided an optical pickup device comprising a light source, an objective lens for converging a light beam emitted from the light source selectively at one of a plurality of signal recording surfaces of a multilayer optical recording medium, and a liquid crystal device, disposed in a light path between the light source and the objective lens, for giving a predetermined phase distribution to transmission light that passes through the liquid crystal device, with both front and back surfaces of the liquid crystal device being flat surfaces. In the optical pickup device, the liquid crystal device includes a pair of transparent substrates and a liquid crystal molecule layer that is formed so as to be sandwiched between the pair of transparent substrates. In addition, a liquid-crystal-molecule-layer-sandwiching-side surface of at least one of the pair of transparent substrates has a shape that is formed such that a thickness distribution of the liquid crystal molecule layer is similar to a phase distribution that is produced when spherical aberration occurs in accordance with a thickness of a transparent layer that covers the selected signal recording surface of the multilayer optical recording medium.

Although not exclusive, a liquid-crystal-molecule-layer-sandwiching-side surface of the other of the pair of transparent substrates may be a flat surface.

According to a third aspect of the present invention, there is provided an optical pickup device comprising a light source, an objective lens for converging a light beam emitted from the light source at a signal recording surface of an optical recording medium and irradiating the signal recording surface of the optical recording medium with the light beam, and a liquid crystal device, disposed in a light path between the light source and the objective lens, for giving a predetermined phase distribution to transmission light that passes through the liquid crystal device, with both front and back surfaces of the liquid crystal device being flat surfaces. In the optical pickup device, the liquid crystal device includes a pair of transparent substrates and a liquid crystal molecule layer that is formed so as to be sandwiched between the pair of transparent substrates. In addition, a liquid-crystal-molecule-layer-sandwiching-side surface of at least one of the pair of transparent substrates has a shape that is formed such that a thickness distribution of the liquid crystal molecule layer is similar to a phase distribution that is produced when coma occurs due to tilting of the optical recording medium with respect to an optical axis of the objective lens.

Although not exclusive, a liquid-crystal-molecule-layer-sandwiching-side surface of the other of the pair of transparent substrates may be a flat surface.

In such an optical pickup device of the present invention, electrodes are formed over the entire surfaces of the pair of transparent substrates which sandwich the liquid crystal molecule layer, without dividing the electrodes. In addition, a uniform voltage is applied to the electrodes. In other words, the phase distribution of the transmission light is determined by the thickness of the liquid crystal molecules through which the transmission light passes.

Accordingly, in the optical pickup device of the present invention, since the electrodes in the liquid crystal device are not divided, loss in the quantity of transmission light caused by diffraction or the like does not occur.

The phase distribution of light that passes through the liquid crystal device is determined by the length of the light path taken by the light that passes through the liquid crystal device, so that it is determined by the thickness distribution of the liquid crystals. Since the liquid crystal thickness distribution is determined by the shapes of the transparent substrates, if the surfaces of the transparent substrates can be formed with shapes similar to desired phase distributions, the transmission light can be given ideal phase distributions.

The present invention makes it possible to provide an optical pickup device which can, while keeping loss of light emitted from a light source as low as possible, properly correct wave aberrations that occur due to various production errors in an optical device, particularly, aberrations resulting from errors in thickness and tilting of an optical recording medium.

DESCRIPTION OF THE PREFERRED EMBODIMENT

Hereunder, a description of an embodiment of the present invention will be given in detail with reference to the drawings.

Figure 1:
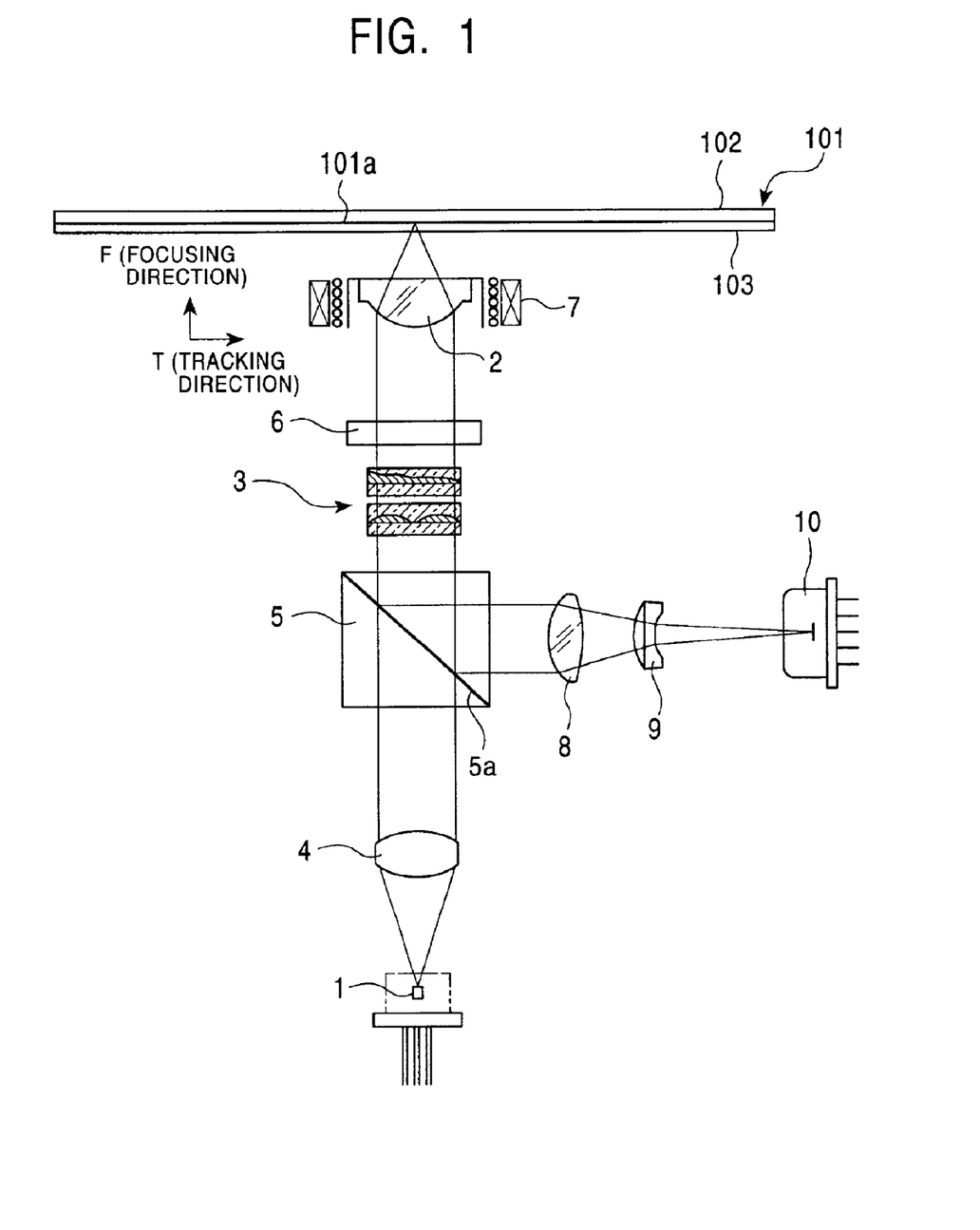
FIG. 1 is a partial cutaway side view of the structure of an optical pickup device of the present invention.

As shown in FIG. 1, an optical pickup device of the present invention comprises a semiconductor laser 1 serving as a light source, an objective lens 2 for converging light beams emitted from the semiconductor laser 1 on a signal recording surface 101a of an optical disk 101 (optical recording medium) and irradiating the signal recording surface 101a with the converged light beams, and liquid crystal devices 3 disposed in a light path between the semiconductor laser 1 and the objective lens 2.

The optical disk 101 is formed by placing a base material 102 and a protective layer 103 upon each other, with a surface of the base material 102 being covered by the protective layer 103 being the signal recording surface 101a. Light beams from the optical pickup device pass through the protective layer 103, and are used to irradiate the signal recording surface 101a. Both front and back surfaces of the liquid crystal devices 3 are flat surfaces. The liquid crystal devices 3 give predetermined phase distributions to transmission light that passes therethrough as described later.

In the optical pickup device, light beams, which are linearly polarized light beams, emitted from the semiconductor laser 1 are collimated by a collimator lens 4 and formed into plane waves. The plane waves are incident upon a beam splitter 5. The plane waves, which are p-polarized light waves with respect to a reflective surface 5a of the beam splitter 5, pass through the reflective surface 5a and the liquid crystal devices 3. Then, the plane waves are converted into circularly polarized light waves by passing through a (/4 plate 6, and the circularly polarized light waves reach the objective lens 2. The objective lens 2 converges the incident light beams at the signal recording surface 101a of the optical disk 101 for irradiating the signal recording surface 101a with the light beams.

By a biaxial actuator 7, the objective lens 2 is supported so as to be movably operable in a focusing direction (that is, the direction of the optical axis of the objective lens 2) that is indicated by arrow F in FIG. 1 and in a tracking direction (that is, a direction orthogonal to the optical axis of the objective lens 2) that is indicated by arrow T in FIG. 1. By operation of the biaxial actuator 7, a focusing adjustment and a tracking adjustment are carried out.

The light beams converged on the signal recording surface 101a of the optical disk 101 are reflected by the signal recording surface 101a and become circularly polarized light beams that are in a direction opposite to the light beams that have traveled towards the optical disk 101. The circularly polarized light beams pass through the objective lens 2 and the (λ4 plate 6 and become linearly polarized light beams that are in a direction perpendicular to the polarization direction of the light beams that have traveled towards the optical disk 101. The linearly polarized light beams pass through the liquid crystal devices 3 and return to the beam splitter 5. The light beams that have returned from the optical disk 101 are, at the beam splitter 5, s-polarized light beams with respect to the reflective surface 5a of the beam splitter 5, so that they are reflected by the reflective surface 5a. The light beams reflected by the beam splitter 5 are converged by a detection lens 8, pass through a multi-lens 9, and are received by a light detector 10. The multi-lens 9 has a circular. cylindrical light-incident surface and a concave light-exiting surface.

In the optical pickup device, the liquid crystal devices 3 give to the transmission light beams predetermined phase distributions that eliminate any aberrations that occur at the signal recording surface 101a when the signal recording surface 101a is irradiated with light beams.

In other words, the phase distributions imparted to the transmission light beams by the liquid crystal devices 3 are phase distributions that have polarities which are the reverse of the polarities of the phase distributions that are produced by wave surface aberrations that occur in a light spot focused on the signal recording surface 101a by the objective lens 2.

For example, if the aberration that one wants to correct is caused by an error dt in the thickness of the protective layer 103 of the optical disk 101 and a skewing θ, spherical aberration is caused to occur by the thickness error dt, and coma is caused to occur by the skewing θ. The low-order spherical aberration and coma are given by the following aberration formulas. The larger the numerical aperture (NA) of the objective lens 2, and the shorter the wavelengths of the light beams emitted from the semiconductor laser 1, the greater are their effects on the aberrations.

A third-order spherical aberration coefficient is given by the following formula:

$$W_{40}=dt/8\times(n^2-1)/n^3\times NA^4$$

A third-order coma coefficient is given by the following formula:

$$W_{31}=t/2\times(n2-1)\times n^2\times\sin\theta\times\cos\theta/(n^2-\sin^2\theta)^{5/2}\times NA^3$$

In these formulas, t is the thickness of the protective layer of the optical disk, dt is the error in thickness of the protective layer of the optical disk, n is the refractive index of the protective layer of the optical disk, and θ is the tilt of the optical disk.

When these aberrations are represented by coordinates (x, y) normalized at a pupil radius of a pupil surface of the objective lens 2, the following Formulas (1) and (2) are obtained:

Third-order spherical aberration: $w(x, y)=w_{40}(x^2+y^2)^2$ (1)

Third-order coma: $w(x, y)=w_{31}((x^2+y^2))$ (2)

When the numerical aperture (NA) of the objective lens 2 is large, phase distributions that correspond to the aberrations cannot be adequately and precisely represented by only the low-order aberrations. High-order spherical aberration and coma are given by the following formulas.

A-fifth-order spherical aberration coefficient is given by the following formula:

$$W60=dt/48\times(n^2-1)\times(n^2+3)/n^5\times NA^6$$

A fifth-order coma coefficient is given by the following formula:

$$W_{51}=t/b\ 8\times(n^2-1)\times n^2\times\sin\theta\times\cos\theta/(n^2-\sin^2\theta)^{9/2}\times NA^5\times(n^4+(3\cos^2\theta-5\sin^2\theta)n^2+4\sin^2\theta-\sin^4\theta)$$

When these aberrations are represented by coordinates (x, y) normalized at a pupil radius of a pupil surface of the objective lens 2, the following Formulas (3) and (4) are obtained:

Fifth-order spherical aberration: $w(x, y)=w_{60}(x^2+y^2)^3$ (3)

Fifth-order coma: $w(x, y)=w_{51}\times(x^2+y^2)^2$ (4)

However, from the practical viewpoint, since the effects of high-order aberrations on the vicinity of the center of a spot of light converged by the objective lens 2 are slight, their influences on recording and reading signals onto and from the optical disk are slight. Therefore, it is sufficient to consider only low-order aberrations with regard to the aberrations which should be corrected.

Figure 2:
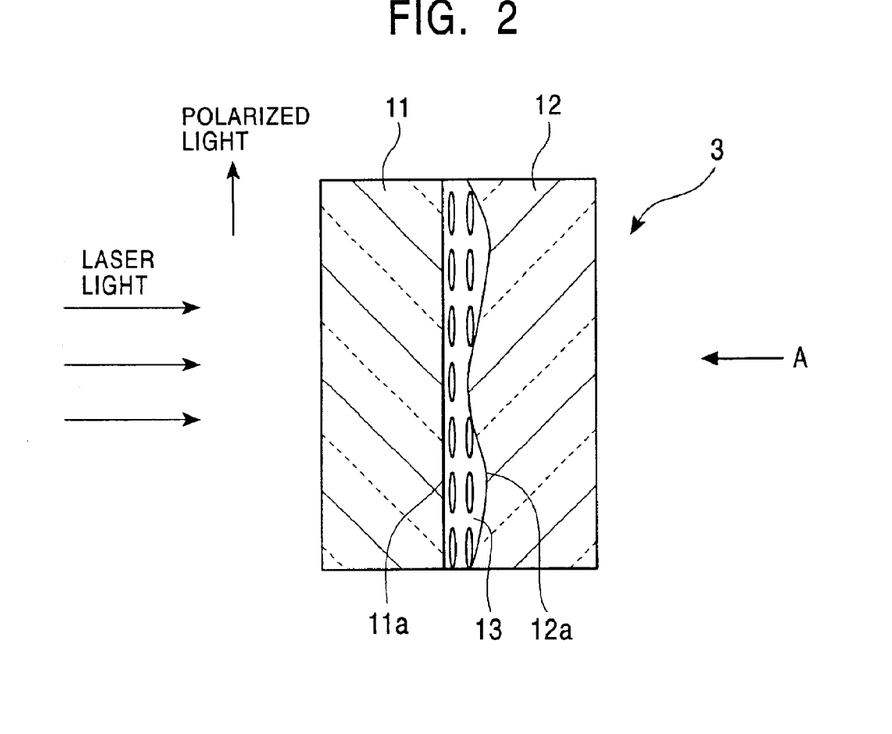
FIG. 2 is a vertical sectional view of the structure of a liquid crystal device for correcting aberrations in the optical pickup device.
Figure 3:
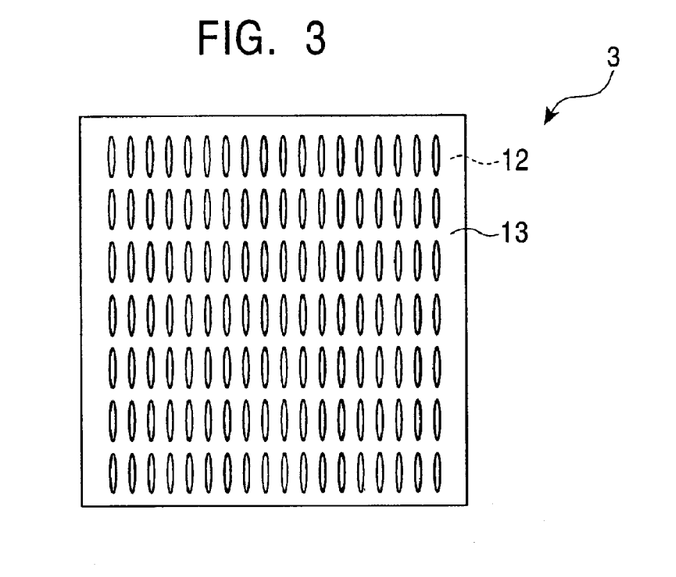
FIG. 3 is a front view of the structure of the liquid crystal device.

As shown in FIGS. 2 and 3, a liquid crystal device 3 is constructed by interposing a liquid crystal molecule layer 13 between a pair of transparent glass substrates 11 and 12. A light-incident surface and a light-exiting surface, that is, the front surface and the back surface of the liquid crystal device 3 are flat surfaces. In the liquid crystal device 3, a surface of one of the glass substrates 11 and 12 has a shape so that the thickness distribution of the liquid crystal layer 13 is similar to a phase distribution that one wants to give to the light that passes through the liquid crystal device 3. In other words, surfaces 11a and 12a of the corresponding opposing glass substrates 11 and 12 which sandwich the liquid crystal layer 13 are such that the surface 11a is a flat surface and the surface 12a has a shape that is similar to the desired phase distribution.

Figure 4:
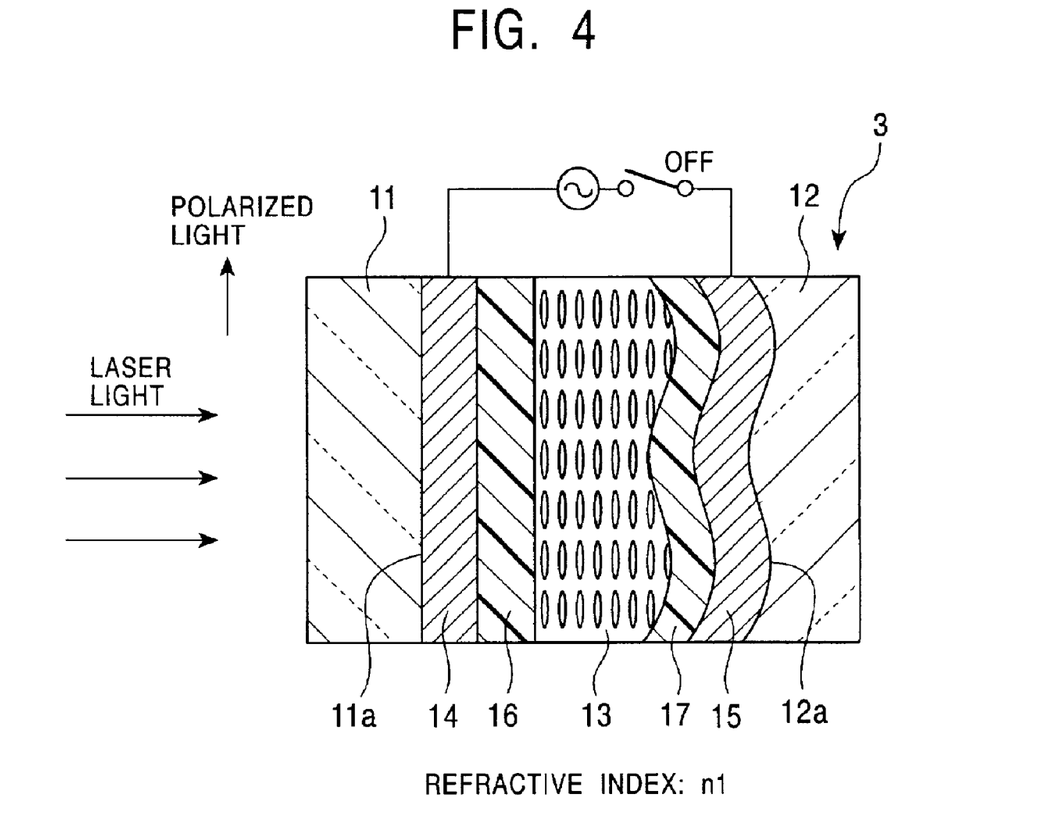
FIG. 4 is a vertical sectional view of the structure of a main portion of the liquid crystal device in a state in which an electrical voltage is not applied.
Figure 5:
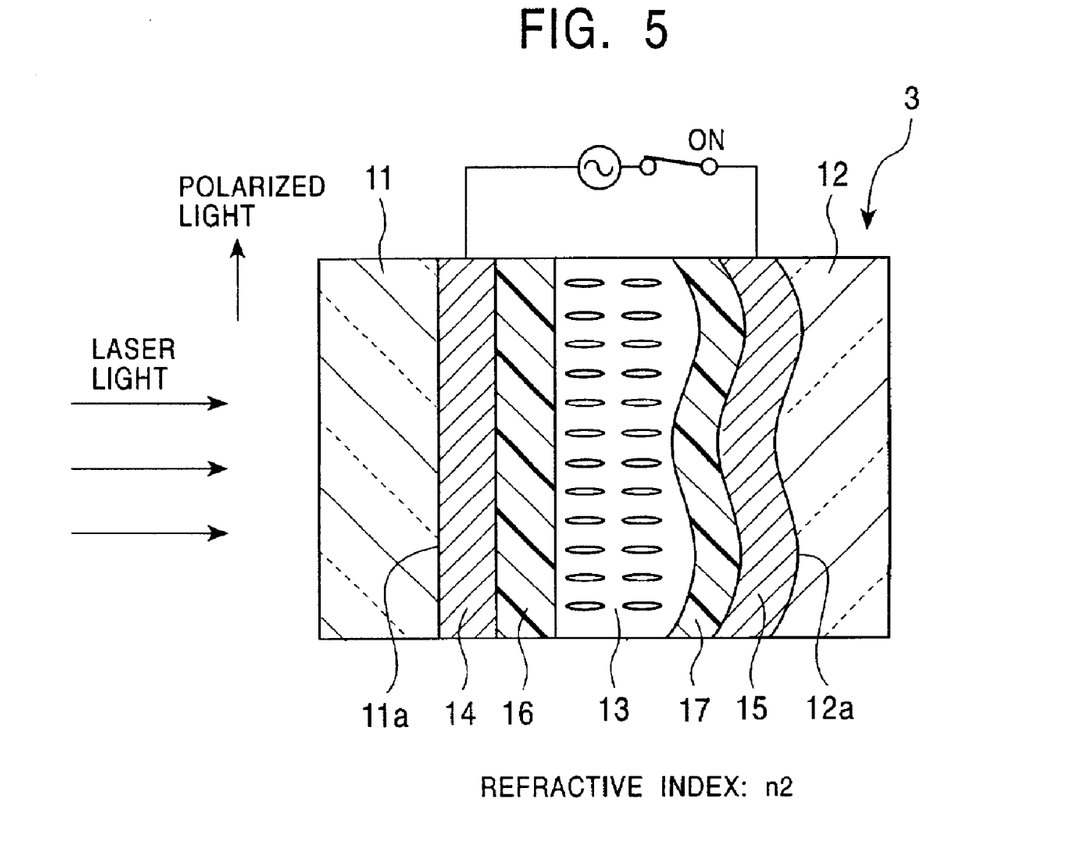
FIG. 5 is a vertical sectional view of the structure of the main portion of the liquid crystal device in a state in which an electrical voltage is applied.

As shown in FIGS. 4 and 5, in the liquid crystal device 3, an electrode 14 and an electrode 15 are formed over the opposing entire surface 11a and the entire surface 12a of the corresponding glass substrate 11 and glass substrate 12, respectively. Alignment films 16 and 17 are formed on the electrodes 14 and 15, respectively. Liquid crystal molecules of the liquid crystal layer 13 are aligned along the alignment films 16 and 17. As shown in FIG. 4, when an electrical voltage is not applied between the electrodes 14 and 15, these liquid crystal molecules are aligned with their long-axis directions parallel to the surfaces 11a and 12a of the corresponding glass substrates 11 and 12. As shown in FIG. 5, when an electrical voltage is applied between the electrodes 14 and 15, the liquid crystal molecules move so that their long-axis directions are perpendicular to the surfaces 11a and 12a of the corresponding glass substrates 11 and 12. The refractive index of the liquid crystal layer 13, when the polarization direction of incident light is the same as the long-axis directions of the liquid crystal molecules, differs from the refractive index of the liquid crystal layer 13 when the polarization direction of the incident light is not the same as the long-axis directions of the liquid crystal molecules. When the long-axis directions of the liquid crystal molecules are parallel to the surfaces 11a and 12a of the corresponding glass substrates 11 and 12, and when the polarization direction of the incident light is the same as the long-axis directions of the liquid crystal molecules, the refractive index of the liquid crystal layer 13 is expressed as n1. When the long-axis directions of the liquid crystal molecules are perpendicular to the surfaces 11a and 12a of the corresponding glass substrates 11 and 12, the refractive index of the liquid crystal layer 13 is expressed as n2. When the long-axis directions of the liquid crystal molecules are oblique from the surfaces 11a and 12a of the corresponding glass substrates 11 and 12, the refractive index of the liquid crystal layer 13 is between n1 and n2 in accordance with the angle of the liquid crystal molecules.

Figure 6:
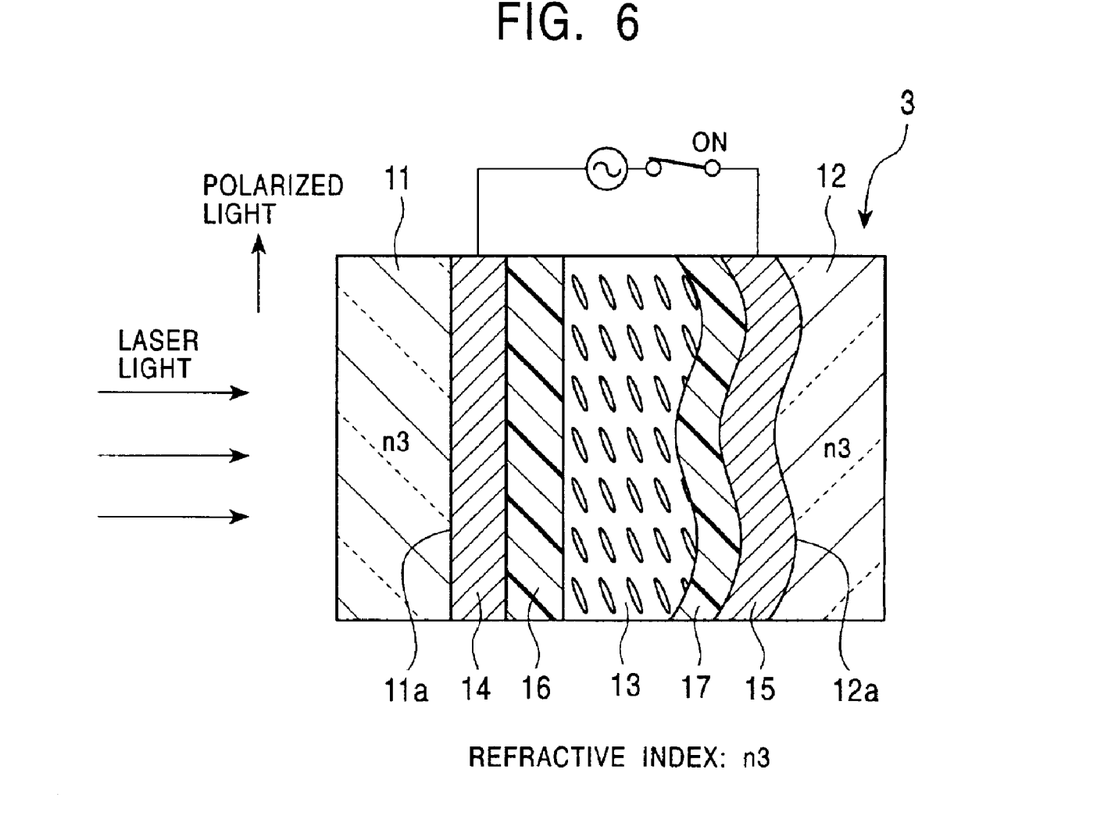
FIG. 6 is a vertical sectional view of the structure of the main portion of the liquid crystal device in a state in which the refractive index of a liquid crystal layer is made equal to the refractive indices of glass substrates by adjusting the applied voltage.

In the optical pickup device, when it is not necessary to give a phase distribution to the transmission light that passes through the liquid crystal device 3, that is, when there are no aberrations at the image-forming surface because there are no production errors in the optical pickup device and the optical disk 101, the voltage applied between the electrodes 14 and 15 of the liquid crystal device 3 is adjusted in order to cause the refractive index of the liquid crystal layer 13 to be equal to a refractive index n3 of each of the glass substrates 11 and 12, as shown in FIG. 6.

Figure 7:
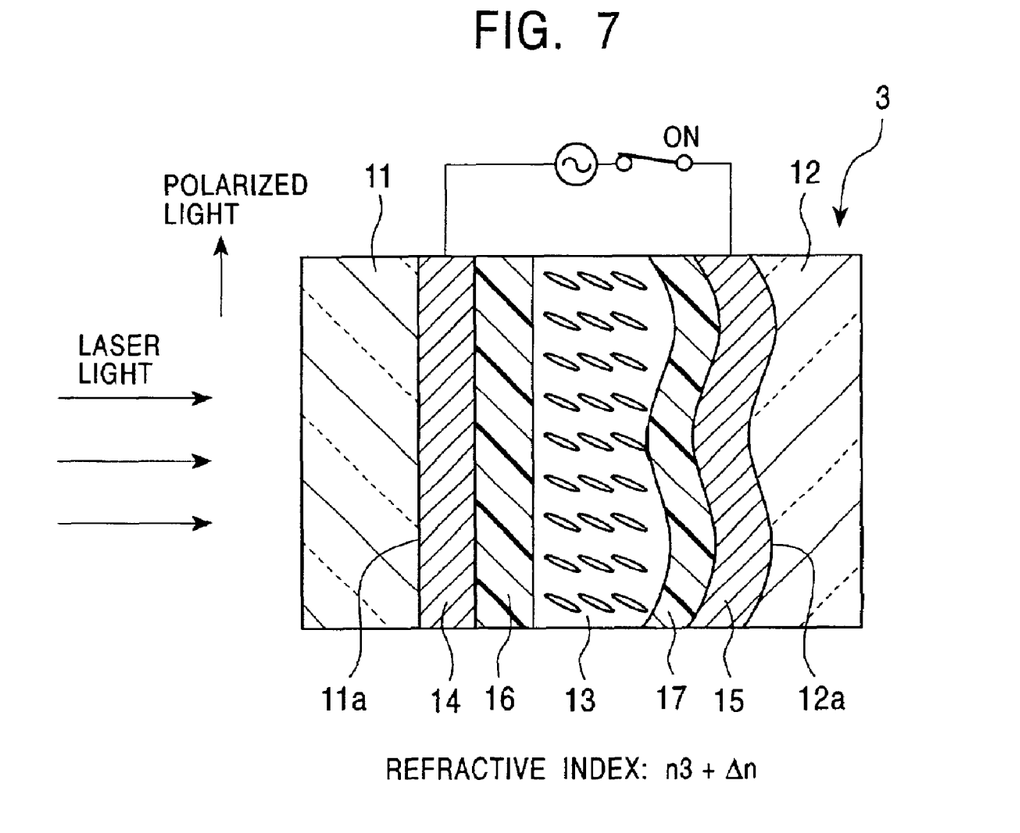
FIG. 7 is a vertical sectional view of the structure of the main portion of the liquid crystal device in a state in which the refractive index of the liquid crystal layer is made different from the refractive indices of the glass substrates by changing the applied voltage.

When one wants to give a phase distribution to the transmission light that passes through the liquid crystal device 3, the refractive index of the liquid crystal layer 13 is changed by changing the voltage applied between the electrodes 14 and 15, as shown in FIG. 7.

The phase distribution of the transmission light that passes through the liquid crystal device 3 is determined by the length of the light path in the liquid crystal device 3. in other words, the phase distribution of the transmission light that passes through the liquid crystal device 3 is determined by the product of a thickness distribution d(x) of the liquid crystal layer 13 and a difference $\Delta$(n between the refractive indices of the liquid crystal layer 13 and each of the glass substrates 11 and 12, that is, it is determined by $d(x) \cdot \Delta n$. Therefore, by producing the difference (n between the refractive indices of the liquid crystal layer 13 and each of the glass substrates 11 and 12 as a result of changing the voltage applied between the electrodes 14 and 15, it is possible-to give to the transmission light that passes through the liquid crystal device 3 a phase distribution that is similar to the thickness distribution of the liquid crystal layer 13.

Figure 8:
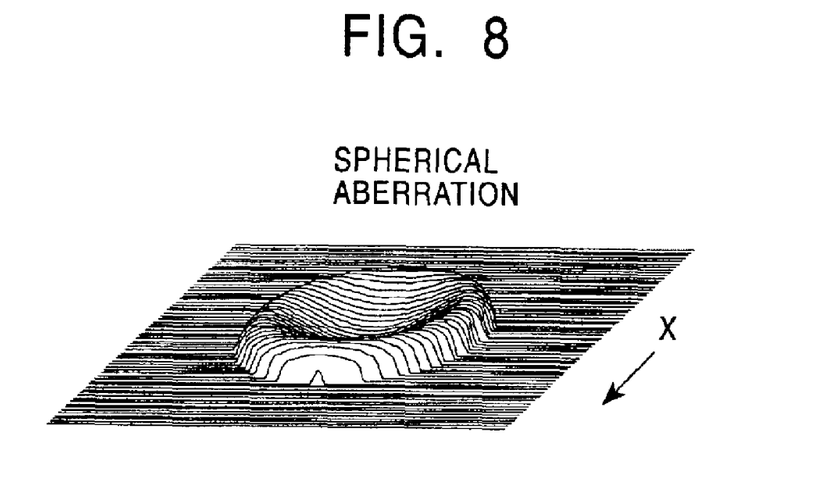
FIG. 8 illustrates a wave surface that is produced when spherical aberration occurs.
Figure 9:
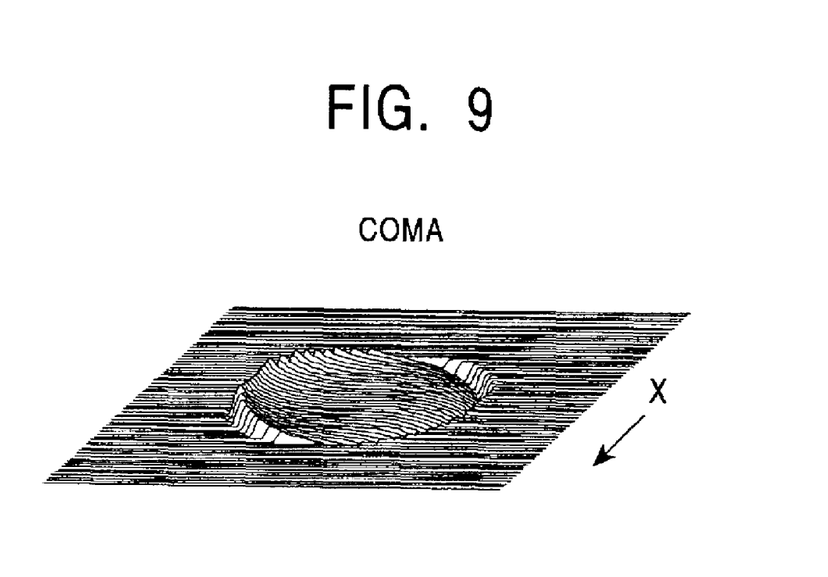
FIG. 9 illustrates a wave surface that is produced when coma occurs.

As shown in FIG. 8, the wave surface that is produced when spherical aberration occurs is one in which there is a difference between the phases at the center portion and the peripheral portion of a light beam. As shown in FIG. 9, the wave surface that is produced when coma occurs is one in which a difference between the phases of one side and the other side of the light beam gradually occurs. Therefore, when the wave surfaces of the transmission light that passes through the liquid crystal device 3 are previously given phase distributions having polarities that are the reverse of the polarities of the phase distributions that are produced when these aberrations occur, there are no aberrations at the time of image formation by the objective lens 2.

Figure 10:
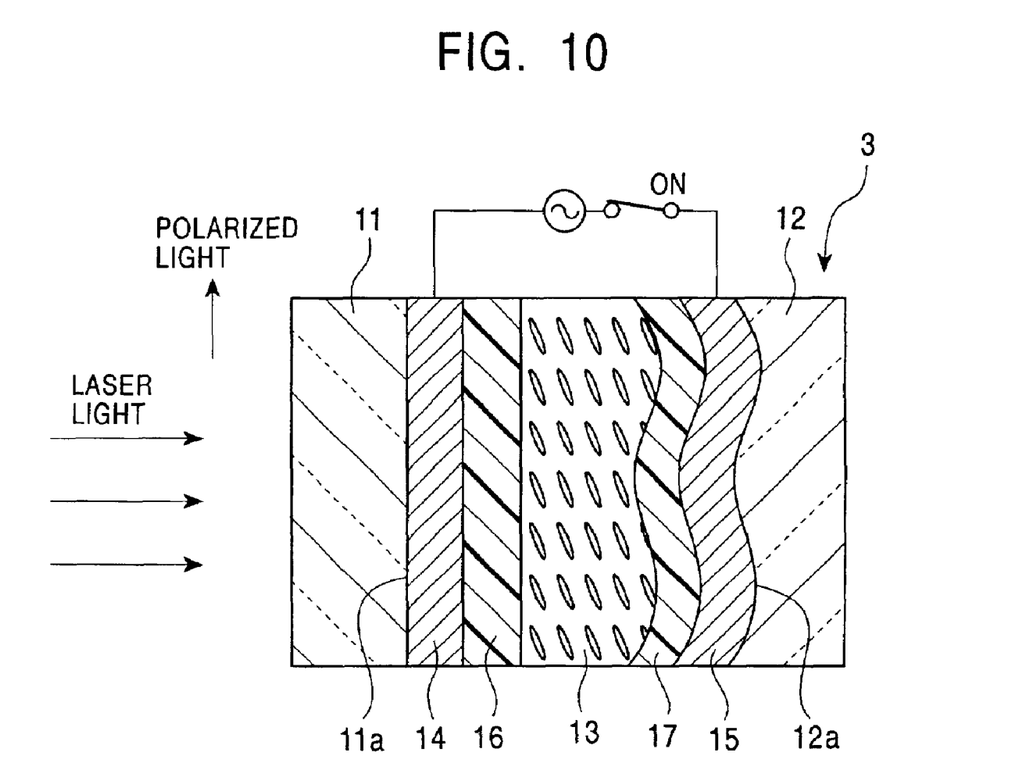
FIG. 10 is a vertical sectional view showing the shape of the main portion of a liquid crystal device for correcting a spherical aberration.
Figure 11:
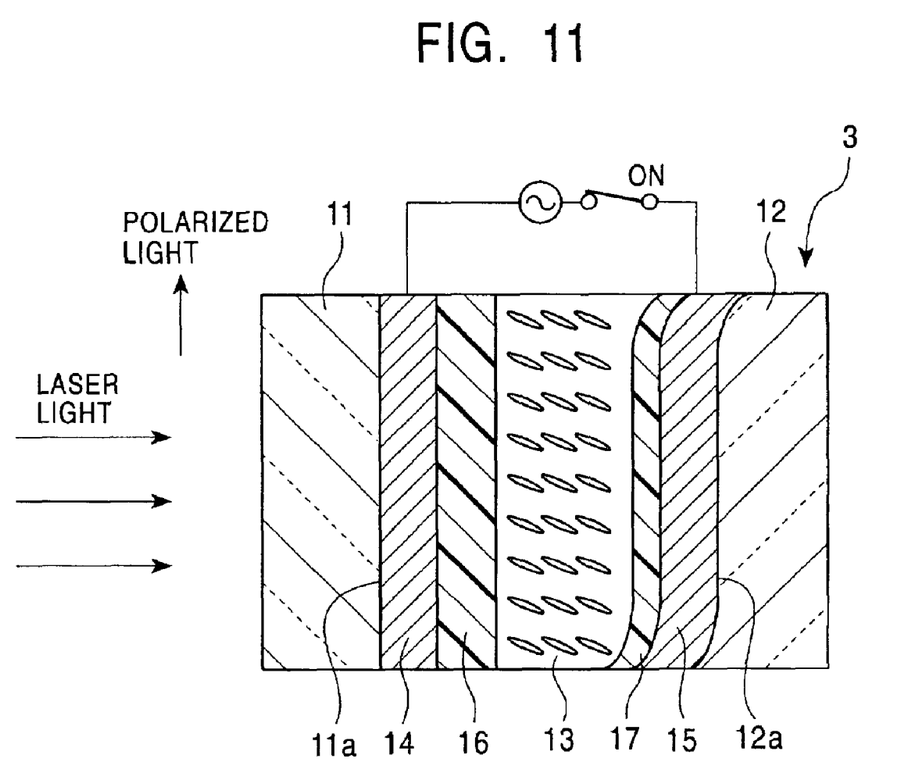
FIG. 11 is a vertical sectional view showing the shape of the main portion of a liquid crystal device for correcting a coma.

Therefore, in order to correct spherical aberration, the thickness distribution of the liquid crystal layer 13 of a liquid crystal device 3 is set to provide a shape that is represented by Formula (1), as shown in FIG. 10. In order to correct coma, the thickness distribution of the liquid crystal layer 13 of a liquid crystal device 3 is set to provide a shape that is represented by Formula (2), as shown in FIG. 11.

Such a liquid crystal device for correcting spherical aberration and such a liquid crystal device for correcting coma may both be superimposed upon each other in a light path leading to the objective lens 2, as shown in FIG. 1, or either one of them may be disposed in this light path. When a liquid crystal device for correcting spherical aberration and a liquid crystal device for correcting coma are superimposed upon each other, it does not matter in what order they are superimposed upon each other, so that either one of them can be disposed closer to the objective lens 2 and are superimposed upon each other.

In the optical pickup device, even if the thickness distributions of the liquid crystal layers 13 in the liquid crystal devices 3 are not similar to the phase distributions that are produced when spherical aberration and coma occur, the liquid crystal devices 3 can correct aberrations. For example, even if the thickness distribution of a liquid crystal layer 13 is set to provide a shape that corresponds to a phase distribution that is produced when an aberration due to defocusing is added to the spherical aberration, a focusing servo operation by the biaxial actuator 7 corrects the aberration caused by the defocusing, so that the aberration can be corrected. However, there is little point in forming such a shape, so that, in order to correct aberrations by minimally correcting a phase, it is sufficient to give a phase distribution having a reverse polarity in relation to the amplitude and the phase distributions resulting from the aberrations. Therefore, the shapes shown in FIGS. 10 and 11 are optimal ones.

The present invention is effective in an optical pickup device used with what is called a multilayer disk. In a multilayer disk, a transparent protective layer is interposed between each of a plurality of signal recording surfaces that have been placed upon each other. Therefore, the thicknesses measured from the surface of the optical disk to each of the signal recording surfaces differ, so that the spherical aberrations that occur are different.

For example, for a DVD, a two-layer disk is used. The optical pickup device is designed so that the interval between the two layers is within an allowable spherical aberration range, so that it does not particularly include a mechanism for correcting spherical aberration.

However, in a DVD, when more than two layers of signal recording surfaces are used, or when the numerical aperture (NA) of the objective lens is made large even if two layers are used, a large spherical aberration that cannot be allowed occurs.

Here, spherical aberration might seem to be reduced by reducing the distance between the layers, that is, by bringing the signal recording surfaces closer together. However, in the case where the distance between the layers is reduced, when a recording operation or a reading operation is being performed on a certain signal recording surface, stray light returns to the optical pickup device from a different signal recording surface, so that precise recording and reading operations can no longer be carried out. Therefore, there is a limit as to how small the inter-layer distances can be made. This limit depends upon the design of the system including an optical system and the light-emitting wavelength of the light source. However, when the lower limit of the distance between the layers that does not cause stray light from a different signal recording surface to become a problem is greater than the upper limit of an allowable spherical aberration distance between the layers, it is necessary to efficiently correct spherical aberration by some means.

To achieve this, when an attempt is made to correct spherical aberration using a related liquid crystal device including divided electrodes, spherical aberration can only be approximately corrected, so that the remaining aberration is large, thereby making it impossible to correct a large spherical aberration such as that in a multilayer disk. Even if a spherical wave is generated and caused to be incident upon an objective lens, the aberration can only be approximately corrected, so that the remaining aberration is large, thereby making it impossible to correct a large spherical aberration in a multilayer disk.

In contrast to this, since in the present invention changes in the shape of the wave surface caused by spherical aberration are themselves changed when correcting spherical aberration, when a large spherical aberration that occurs in a multilayer disk is corrected, the remaining aberration is small, so that the spherical aberration can be properly corrected.

Although, in the above-described embodiment, in a liquid crystal device, only one of the liquid-crystal-layer-sandwiching surfaces of the glass substrates is formed with a shape that is similar to a desired phase distribution, the present invention is not limited thereto, so that both of the liquid-crystal-layer-sandwiching surfaces of the glass substrates may be formed with shapes that are similar to desired phase distributions.

In other words, since the phase distributions that one wants to give to the transmission light that passes through a liquid crystal device is determined by the product of the thickness distribution d(x) of the liquid crystal layer that is sandwiched by the glass substrates and a difference Δn between the refractive indices of the liquid crystal layer and each of the glass substrates, that is, by the d(x)·Δn, all that needs to be done is to form the liquid crystal layer into a shape that is formed when the thickness distribution is similar to the desired phase distribution, independent of the shapes of the glass substrates.

The shape of the surface of each of the glass substrates that sandwiches the liquid crystal layer of a liquid crystal device may be formed by using an ultraviolet (UV) curing agent to form a predetermined surface shape, and bonding these surfaces having the predetermined shapes to flat glass substrates.

What is claimed is:

1. An optical pickup device comprising:
    a light source;
    an objective lens for converging a light beam emitted from the light source at a signal recording surface of an optical recording medium and irradiating the signal recording surface of the optical recording medium with the light beam; and
    first and second liquid crystal devices disposed in a light path between the light source and the objective lens for giving a predetermined phase distribution to transmission light that passes through each liquid crystal device, with both front and back surfaces of each liquid crystal device being flat surfaces;
    wherein each liquid crystal device includes a pair of transparent substrates and a liquid crystal molecule layer that is formed so as to be sandwiched between the pair of transparent substrates;
    wherein a liquid-crystal-molecule-layer-sandwiching side surface of at least one of the pair of transparent substrates of the first liquid crystal device has a shape that is formed such that a thickness distribution of the liquid crystal molecule layer in the first liquid crystal device is similar to a phase distribution that is produced when spherical aberration occurs due to an error in a thickness of a transparent layer that covers the signal recording surface of the optical recording medium; and
    wherein a liquid-crystal-molecule-layer-sandwiching-side surface of a least one of the pair of transparent substrates of the second liquid crystal device has a shape that is formed such that a thickness distribution of the liquid crystal molecule layer in the second liquid crystal device is similar to a phase distribution that is produced when coma aberration occurs due to tilting of the optical recording medium with respect to an optical axis of the objective lens.

2. An optical pickup device according to claim 1, wherein a liquid-crystal-molecule-layer-sandwiching-side surface of the other of the pair of transparent substrates in each liquid crystal device is a flat surface.

3. An optical pickup device comprising:
    a light source;
    an objective lens for converging a light beam emitted from the light source selectively at one of a plurality of signal recording surfaces of a multilayer optical recording medium; and
    first and second liquid crystal devices disposed in a light path between the light source and the objective lens for giving a predetermined phase distribution to transmission light that passes through each liquid crystal device, with both front and back surfaces of each liquid crystal device being flat surfaces;
    wherein each liquid crystal device includes a pair of transparent substrates and a liquid crystal molecule layer that is formed so as to be sandwiched between the pair of transparent substrates;

wherein a liquid-crystal-molecule-layer-sandwiching-side surface of at least one of the pair of transparent substrates of the first liquid crystal device has a shape that is formed such that a thickness distribution of the liquid crystal molecule layer in the first liquid crystal device is similar to a phase distribution that is produced when spherical aberration occurs in accordance with a thickness of a transparent layer that covers the selected signal recording surface of the multilayer optical recording medium; and wherein a liquid-crystal-molecule-layer-sandwiching-side surface of at least one of the pair of transparent substrates of the second liquid crystal device has a shape that is formed such that a thickness distribution of the liquid crystal molecule layer in the second liquid crystal device is similar to a phase distribution that is produced when coma aberration occurs due to tilting of the optical recording medium with respect to an optical axis of the objective lens.

4. An optical pickup device according to claim 3, wherein a liquid-crystal-molecule-layer-sandwiching-side surface of the other of the pair of transparent substrates in each liquid crystal device is a flat surface.

5. An optical pickup device comprising:

a light source;

an objective lens for converging a light beam emitted from the light source at a signal recording surface of an optical recording medium and irradiating the signal recording surface of the optical recording medium with the light beam; and a liquid crystal device, disposed in a light path between the light source and the objective lens, for giving a predetermined phase distribution to transmission light that passes through the liquid crystal device, with both front and back surfaces of the liquid crystal device being flat surfaces;

wherein the liquid crystal device includes a pair of transparent substrates and a liquid crystal molecule layer that is formed so as to be sandwiched between the pair of transparent substrates; and wherein a liquid-crystal-molecule-layer-sandwiching-side surface of at least one of the pair of transparent substrates has a shape that is formed such that a thickness distribution of the liquid crystal molecule layer is similar to a phase distribution that is produced when coma occurs due to tilting of the optical recording medium with respect to an optical axis of the objective lens.

6. An optical pickup device according to claim 5, wherein a liquid-crystal-molecule-layer-sandwiching-side surface of the other of the pair of transparent substrates is a flat surface.

7. An optical pickup device according to claim 1, wherein the first and second liquid crystal devices are superimposed upon one another.

8. An optical pickup device according to claim 3, wherein the first and second liquid crystal devices are superimposed upon one another.

9. An optical pickup device comprising:

a light source;

an objective lens for converging a light beam emitted from the light source at a signal recording surface of an optical recording medium and irradiating the signal recording surface of the optical recording medium with the light beam; and a liquid crystal device, disposed in a light path between the light source and the objective lens, for giving a predetermined phase distribution to transmission light that passes through the liquid crystal device, with both front and back surfaces of the liquid crystal device being flat surfaces;

wherein the liquid crystal device includes first and second transparent substrates and a liquid crystal molecule layer that is formed so as to be sandwiched between the first and second transparent substrates; and wherein a liquid-crystal-molecule-layer-sandwiching-side surface of the first and second transparent substrates has a shape that is formed such that a thickness distribution of the liquid crystal molecule layer is similar to a phase distribution that is produced when a wave aberration occurs.

10. An optical pickup device according to claim 9, wherein the wave aberration is a spherical aberration that occurs in accordance with a thickness of a transparent layer that covers the selected signal recording surface of the multilayer optical recording medium or a coma aberration that occurs due to tilting of the optical recording medium with respect to an optical axis of the objective lens.

* * * * *

UNITED STATES PATENT AND TRADEMARK OFFICE
CERTIFICATE OF CORRECTION

PATENT NO.       : 6,992,966 B2                                              Page 1 of 1
APPLICATION NO.  : 10/166601
DATED            : January 31, 2006
INVENTOR(S)      : Kenji Yamamoto It is certified that error appears in the above-identified patent and that said Letters Patent is hereby corrected as shown below:

Title Page:
Item (74) should be read as follows:
*Attorney, Agent or Firm*--Rader, Fishman & Grauer PLLC; Ronald P. Kananen On the title page, Item [57]:
Abstract
Line 13, "substrate" should read -- substrates --.

Signed and Sealed this

Twenty-second Day of August, 2006

JON W. DUDAS
*Director of the United States Patent and Trademark Office*